(No Model.)
E. T. COVELL.
SEAT FOR HARNESS SADDLE TREES.
No. 370,319. Patented Sept. 20, 1887.
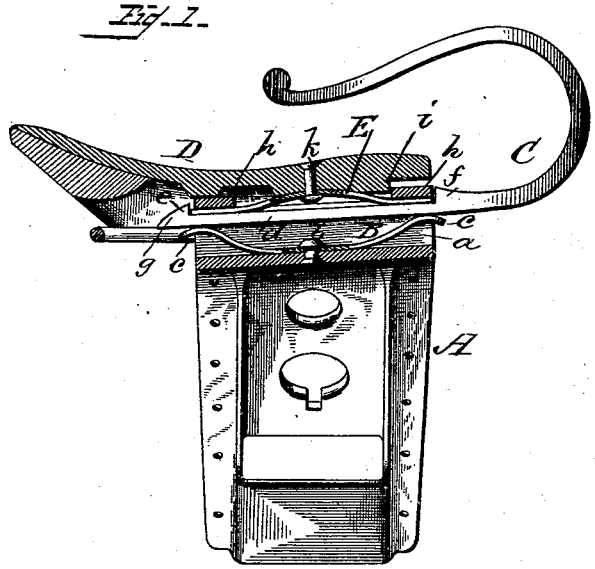
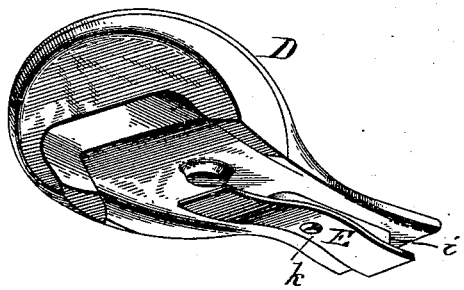
Witnesses
Inventor
Edward T. Covell,
By his Attorney Chas. H. Fowler

UNITED STATES PATENT OFFICE.

EDWARD T. COVELL, OF NEW BEDFORD, MASSACHUSETTS, ASSIGNOR OF ONE-HALF TO CHARLES F. CUSHING, OF SAME PLACE.

SEAT FOR HARNESS-SADDLE TREES.

SPECIFICATION forming part of Letters Patent No. 370,319, dated September 20, 1887.

Application filed January 18, 1887. Serial No. 224,706. (No model.)

*To all whom it may concern:*

Be it known that I, EDWARD T. COVELL, a citizen of the United States, residing at New Bedford, in the county of Bristol and State of Massachusetts, have invented certain new and useful Improvements in Seats for Harness-Saddle Trees; and I do hereby declare that the following is a full, clear, and exact description of the same, reference being had to the annexed drawings, making a part of this specification, and to the letters and figures of reference marked thereon.

Figure 1 of the drawings is a sectional elevation of a harness-saddle tree and seat connected thereto, also the checkrein-hook in elevation, showing it connected to the tree; and Fig. 2, an under-side perspective view of the seat.

The present invention has for its object to improve the means for detachably connecting the seats to harness-saddle trees, whereby they may be conveniently removed and replaced with equal facility, which object I attain by the construction substantially as shown in the drawings, and hereinafter described and claimed.

In the accompanying drawings, A represents a harness-saddle tree provided with a channel, $a$, in which is located a suitable spring, B, for holding therein the shank of a checkrein-hook, C, said spring being secured to the tree at $b$, and has curved extremities or ends, as shown at $c$, which bear against the shank $d$ of the hook, which shank has shoulders $e\ f$, which, in connection with the spring and stops $h$, located above the channel, hold the shank of the hook securely in place and admit of the hook being readily detached from the harness-saddle tree, as well as having a downwardly-yielding motion when in position. The extremity of the shank $d$ has a beveled end, $g$, to facilitate the end of the shank entering the channel when connecting the hook to the tree.

The construction of the harness-saddle tree and checkrein-hook, as above described, will form the subject of separate patents, and therefore further description of their purpose and advantages is deemed unnecessary.

The seat D is of the usual form and construction, except that it is provided upon its under side with a catch, E, and stop $i$, the latter preventing the seat from being pushed forward when in position on the saddle-tree, and the rear end of the catch is prevented from being pushed backward by the shoulder $e$ on the shank of the checkrein-hook.

The catch E, I construct of a rectangular piece of metal, and, if desired, spring metal may be used, the strip or piece of metal being riveted or otherwise attached to the seat, as shown at $k$, and its ends curved downwardly, so as to enable the free ends of the catch or strip of metal to pass under the stops $h$, whereby the seat is securely held in position on the saddle-tree and readily detached therefrom when desired.

When removing the seat, it is considered preferable to first remove the hook C, when such a hook is used, after which the seat is pushed back until the end of the catch E passes from under the forward one of the stops $h$, when the seat may be readily disconnected from the saddle-tree.

As there are no bolts, screws, or nuts employed, all danger of injury to the horse's back by their coming in contact therewith is entirely avoided, which is a great objection to the saddle-trees now in ordinary use.

Having now fully described my invention, what I claim as new, and desire to secure by Letters Patent, is—

A detachable seat for harness-saddle trees, provided upon its under side with a stop and a catch for retaining the seat in position on the tree, said catch consisting of a rectangular piece of metal secured at or near its middle to the seat and extending lengthwise thereof, and having its ends free to operate as a catch, substantially as and for the purpose set forth.

In testimony that I claim the above I have hereunto subscribed my name in the presence of two witnesses.

EDWARD T. COVELL.

Witnesses:
 A. EDWIN CLARKE,
 DANL. S. DEVOLL.